(12) United States Patent
Lai et al.

(10) Patent No.: US 7,518,975 B2
(45) Date of Patent: Apr. 14, 2009

(54) OPERATING CURRENT MODIFYING DEVICE AND METHOD

(76) Inventors: Ronnie Lai, 8F, No. 535, Chung-Cheng Rd., Hsin-Tien, Taipei 231 (TW); Ronald Chen, 8F, No. 535, Chung-Cheng Rd., Hsin-Tien, Taipei 231 (TW)

( * ) Notice: Subject to any disclaimer, the term of this patent is extended or adjusted under 35 U.S.C. 154(b) by 620 days.

(21) Appl. No.: 11/339,749

(22) Filed: Jan. 26, 2006

(65) Prior Publication Data

US 2006/0181327 A1 Aug. 17, 2006

Related U.S. Application Data

(60) Provisional application No. 60/646,634, filed on Jan. 26, 2005.

(51) Int. Cl.
*G11B 7/00* (2006.01)
*H01S 3/13* (2006.01)

(52) U.S. Cl. .................. 369/116; 369/121; 372/29.015; 372/38.02; 372/38.07

(58) Field of Classification Search ................. 369/116, 369/47.5, 47.51, 120, 121, 122; 372/29.015, 372/38.02, 38.07, 29.01, 29.011, 38.01, 38.1
See application file for complete search history.

(56) References Cited

U.S. PATENT DOCUMENTS

| 6,671,248 B2 * | 12/2003 | Miyabata et al. ............ 369/116 |
| 6,922,383 B2 * | 7/2005 | Sakata et al. ............. 369/53.26 |
| 2004/0136420 A1 | 7/2004 | Robinson et al. |
| 2006/0181990 A1 | 8/2006 | Lai et al. |

* cited by examiner

*Primary Examiner*—Nabil Z Hindi
(74) *Attorney, Agent, or Firm*—Perkins Coie LLP (57) ABSTRACT

An operating current modifying device is provided for a power generating element. The power generating element generates an output power when the operating current is larger than a threshold current in the power generating element. A functional relationship exists between the threshold current and the temperature of the electrical device. The operating current modifying device may include a threshold current modifying module, a power modifying module, a current compensating module, and a power control module.

20 Claims, 8 Drawing Sheets

FIG. 8

OPERATING CURRENT MODIFYING DEVICE AND METHOD

BACKGROUND OF THE INVENTION

1. Field of Invention

The invention relates to an operating current modifying device and an operating current modifying method, and, in particular, to an operating current modifying device and an operating current modifying method, which are applicable to an optical disk drive.

2. Related Art

The power generating element of an electric device is easily affected by temperature. For example, the performance and accurate of the electric device may vary due to thermal factors. In order to control the power generating element at different temperatures, a proper control module must be designed to modify the effects of thermal factors.

In order to control the output power of the power generating element at different temperatures, a proper control module is designed in the power generating element. Herein, a power feedback signal, which is generated when the power generating element generates the output power, is applied to control the operating currents for the power generating element to generate the output power at different powers.

Figure 1:
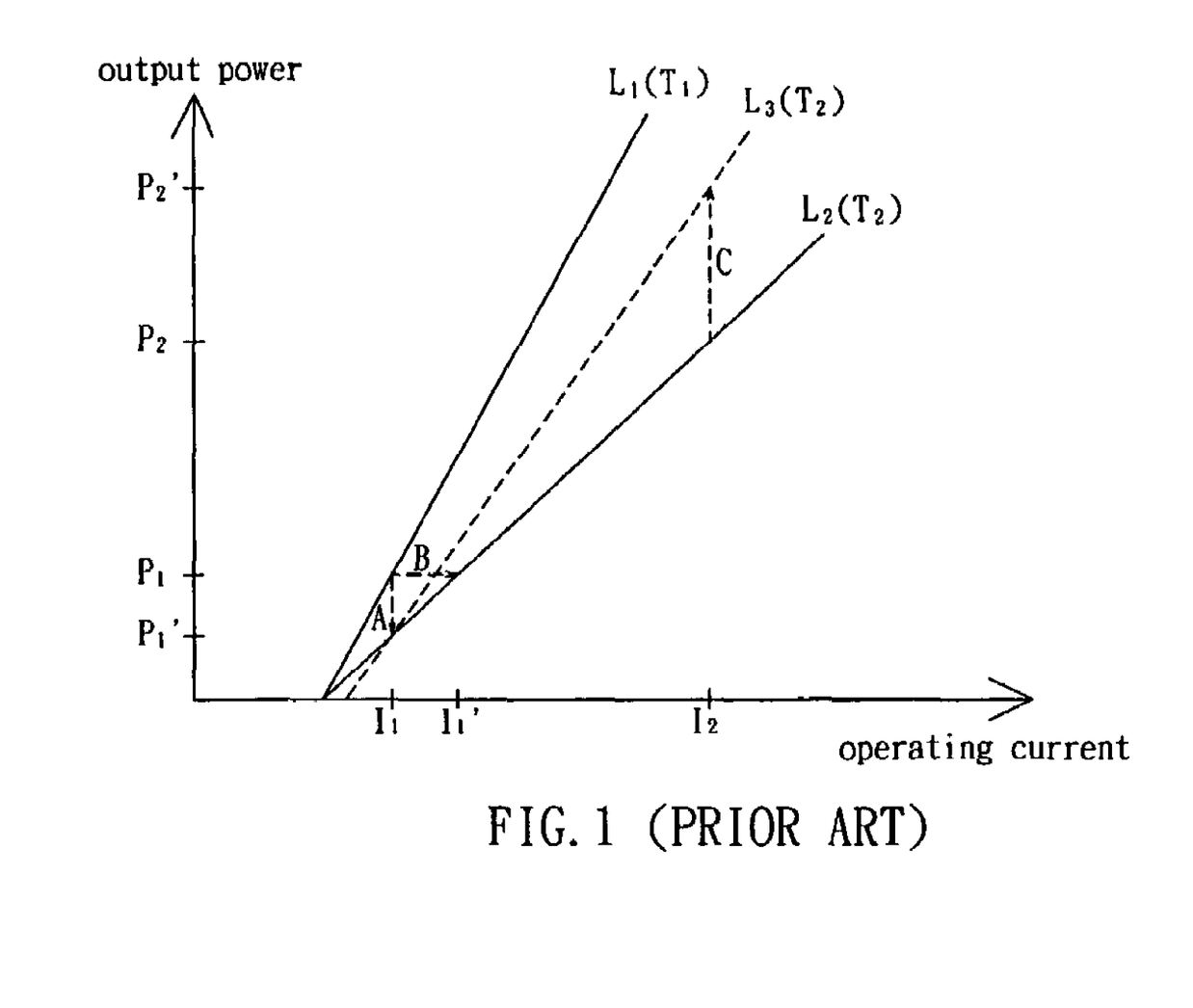
FIG. 1 is a curve relation diagram showing the output power and the operating current of the conventional power generating element.

Referring to FIG. 1, when the temperature of the power generating element is at a temperature $T_1$, the output power and the operating current of the power generating element are related in a line $L_1$. In other words, when the operating temperature of the power generating element is at the temperature $T_1$ and the operating current is at a current $I_1$, the power generating element generates the output power at a power $P_1$. If the operating current is at a current $I_2$, the power generating element generates an output power at a power $P_2$.

If the temperature of the power generating element rises to a temperature $T_2$, the operating current equal to the current $I_1$ will drive the power generating element to generate the output power at another power $P_1'$ (as the dotted line A). At the same time, in order to control the output power at the power $P_1$, close loop feedback control is adopted to calculate the current for compensating the power difference ($P_1'$-$P_1$). Then, the calculation is referenced to increase the operating current (as the dotted line B) until the power generating element generates the output power at the power $P_1$. At this time, the operating current is at a current $I_1'$.

The prior art assumes that the relationship between the output power and operating current of the power generating element is represented by a line $L_2$ when the temperature of the power generating element is at the temperature $T_2$. If the power generating element is controlled to generate the output power at a power $P_2$, the control module calculates the required current $I_2'$ for driving the power generating element to generate the output power at the power $P_2$ according to the current $I_1$ and a scale relationship (formula (1)) between the power $P_1'$ and the power $P_2$.

$$I_2' = \frac{P_2}{P_1'}(I_1' - I_1) + I_2 \tag{1}$$

In fact, when the temperature of the power generating element is at a temperature $T_2$, the output power and the operating current of the power generating element are actually related in a line $L_3$ rather than the line $L_2$. Therefore, the calculated operating current, which is equal to a current $I_2'$, drives the power generating element to generate the output power at the power $P_2'$ (as the dotted line C). Thus, the power generating element does not correctly generate the output power at the power $P_2$ and the output power is not precisely controlled at the temperature $T_2$.

The power error caused by the current $I_2'$ results from the prior technique's disregard of the threshold currents (intersections of the line $L_1$, line $L_3$ and the current axis). If the threshold current is ineffectual, the error caused by the prior technique is not obvious. However, if the threshold current is effectual or the output power is to be controlled more precisely, the operating current calculated according to the prior technique may include error.

Figure 2:
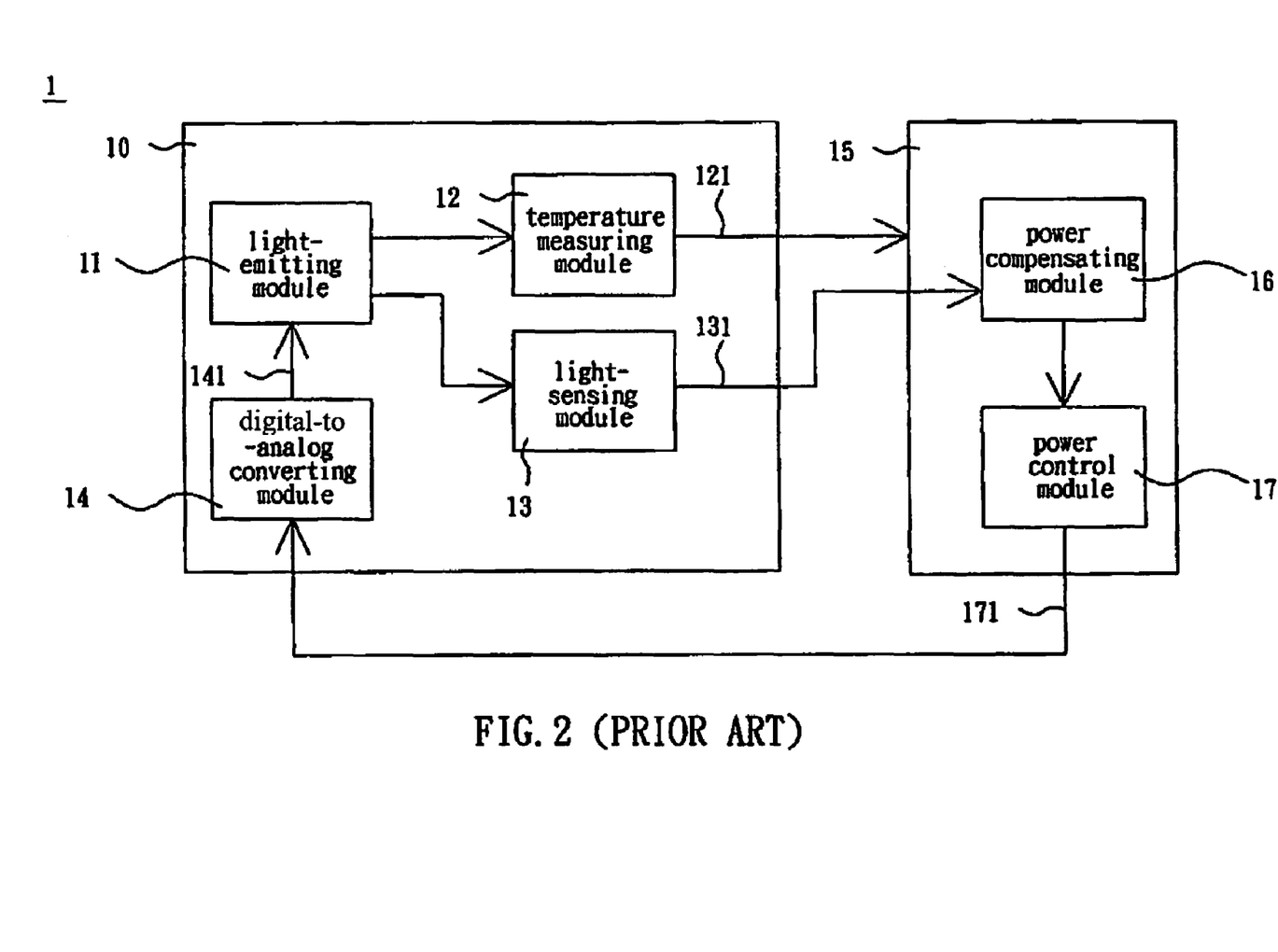
FIG. 2 is a block diagram showing the power control structure of the optical pickup head in the optical disk drive.
Figure 3:
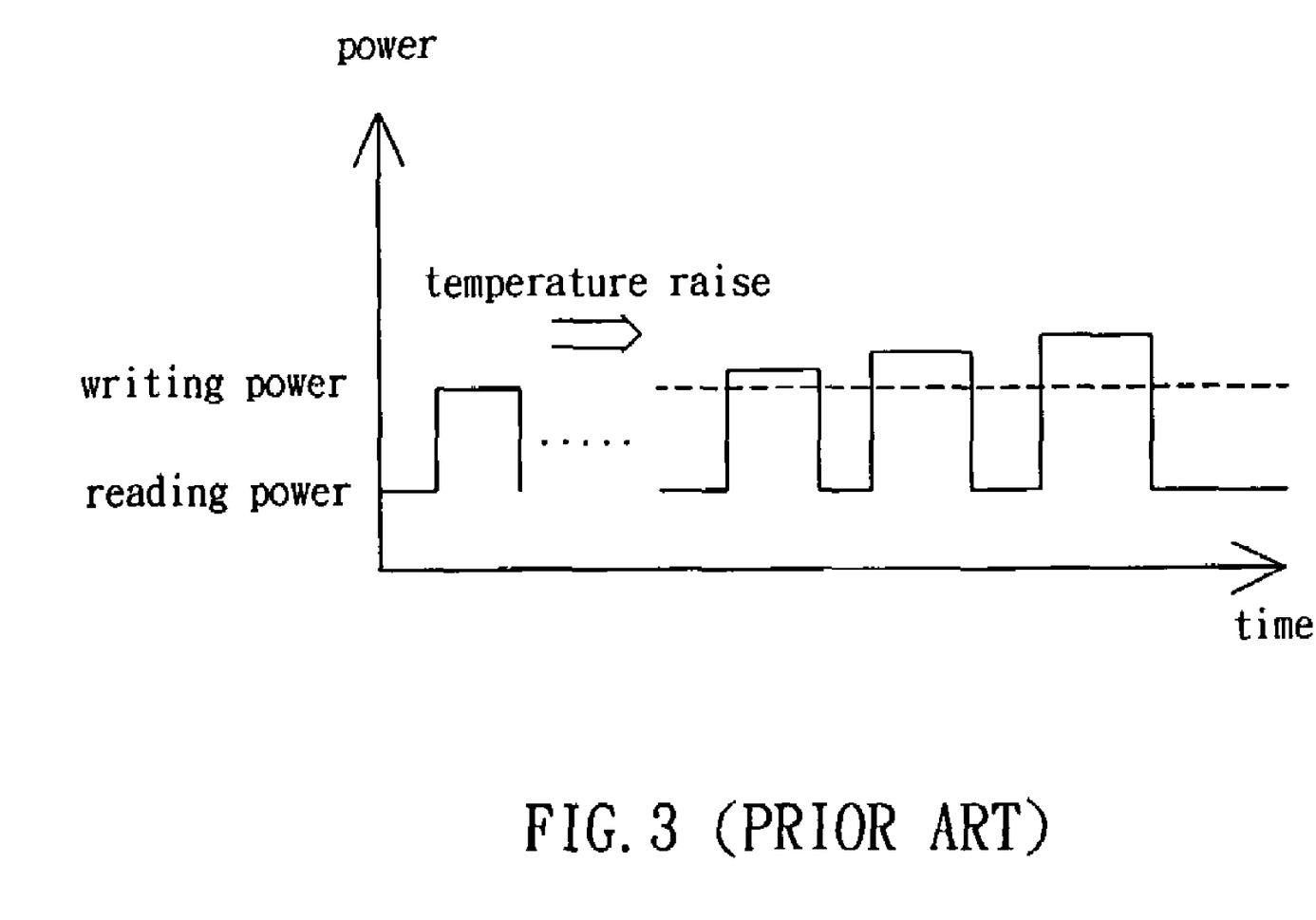
FIG. 3 is a schematic view showing the writing power and the reading power of the conventional optical pickup head.

Taking an optical disk drive, for example, an optical pickup head of the optical disk drive generates an output power for accessing the optical disk. Referring to FIG. 2 and FIG. 3, in the power control structure of the optical pickup head in the optical disk drive, an optical disk drive 1 includes an optical pickup head 10 and a power controller 15. The optical pickup head 10 includes a light-emitting module 11, a temperature measuring module 12, a light-sensing module 13, and a digital-to-analog converting module 14. The power controller 15 includes a power compensating module 16 and a power control module 17.

The temperature measuring module 12 measures the temperature of the light-emitting module 11 to generate a temperature signal 121. According to the temperature signal 121, the power controller 15 can control the light-emitting module 11 to prevent it from overheating. The light-sensing module 13 senses the output power of the light-emitting module 11 to generate a power feedback signal 131. The power compensating module 16 receives the power feedback signal 131 and calculates the power compensating current by a close loop feedback control. The power control module 17 generates a current control signal 171 according to the power compensating current in the above method. The digital-to-analog converting module 14 receives the current control signal 171 to generate an operating current 141. The operating current 141 drives the light-emitting module 11 to generate output powers $P_1$ and $P_2$. The output powers $P_1$ and $P_2$ are respectively a writing power and a reading power for accessing an optical disk.

However, if the temperature of the light-emitting module 11 rises, only the reading power is precisely controlled but the writing power is not due to the disregarded threshold currents. Therefore, the optical pickup head 10 does not correctly access the optical disk, and, even more, the lifetime of the optical pickup head 10 and the endurance of the optical disk drive 1 are reduced.

It is therefore a subject of the invention to provide an operating current modifying device and an operating current modifying method, which calculate the required current to drive the power generating element to generate the output power at different powers as the temperature of the power generating element varies.

SUMMARY OF THE INVENTION

In view of the foregoing, the invention is to provide an operating current modifying device and an operating current modifying method, which can calculate the operating current of the power generating element according to the different temperatures of the power generating element.

To achieve the above, an operating current modifying device is provided for a power generating element. The power generating element initially generates an output power when an operating current is larger than a threshold current of the power generating element. The threshold current is related to a temperature of the power generating element in a functional relationship. The operating current modifying device includes a threshold current modifying module, a power modifying module, a current compensating module, and a power control module. The threshold current modifying module receives a temperature signal from the power generating element and outputs a threshold current modifying signal according to the temperature signal and the functional relationship. The power modifying module receives a power feedback signal from the power generating element and a target power signal, and outputs an operating current modifying signal. The current compensating module receives the threshold current modifying signal and the operating current modifying signal, and distributes the operating current modifying signal into an operating current compensating signal and a threshold current compensating signal. The power control module receives the operating current compensating signal and the threshold current compensating signal to adjust the operating current.

To achieve the above, an operating current modifying method is provided for a power generating element. The power generating element initially generates an output power when an operating current is larger than a threshold current of the power generating element. The threshold current is related to a temperature of the power generating element in a functional relationship. The operating current modifying method includes the following steps: generating a threshold current modifying signal according to the temperature and the functional relationship of the power generating element; outputting an operating current modifying signal according to a difference between a target power signal and a power feedback signal from the power generating element; distributing the operating current modifying signal into an operating current compensating signal and a threshold current compensating signal according to the threshold current modifying signal; and adjusting the operating current according to the operating current compensating signal and the threshold current compensating signal.

As mentioned above, the operating current modifying device and method according to the invention control the operating current based on the temperature of the power generating element and the functional relationship. Thus, the required current for different output powers and temperatures in the power generating element is controlled, such that the output power of the power generating element is precisely controlled.

BRIEF DESCRIPTION OF THE DRAWINGS

The invention will become more fully understood from the detailed description given herein, as illustrated below, and thus is not provided as limitations of the present invention, and wherein.

DETAILED DESCRIPTION OF THE INVENTION

The present invention will be apparent from the following detailed description, which proceeds with reference to the accompanying drawings, wherein the same references relate to the same elements.

Referring to FIG. 2, an operating current modifying device 2 is provided for a power generating element. The power generating element may be an optical pickup head 4. The optical pickup head 4 includes a light-emitting module 41, a light-sensing module 42, a temperature measuring module 43, and a digital-to-analog converting module 44.

Figure 4:
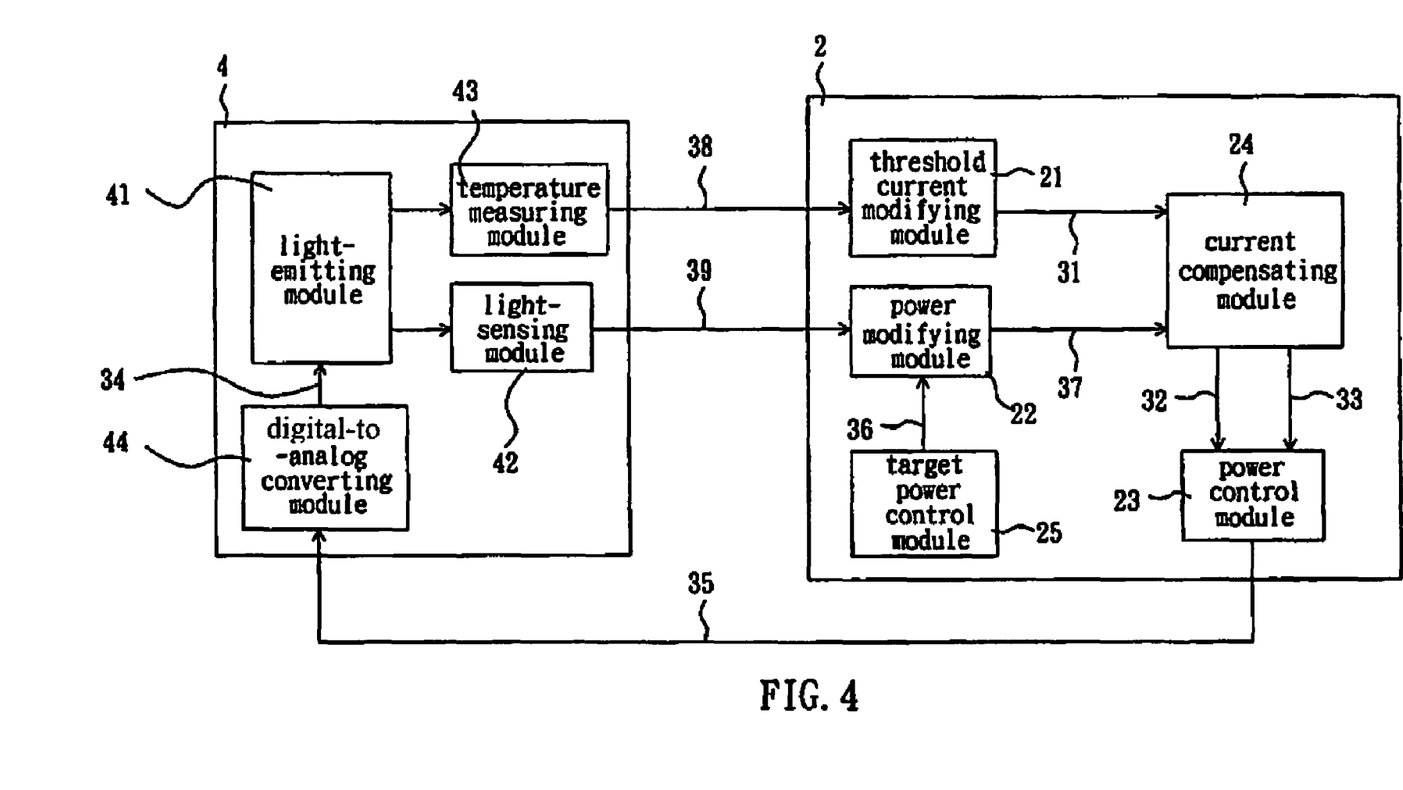
FIG. 4 is a block diagram showing an operating current modifying device according to a preferred embodiment of the invention.

In the optical pickup head 4, when an operating current 34 is larger than a threshold current of the light-emitting module 41, the operating current 34 drives the light-emitting module 41 to generate an output power. The threshold current is related to a temperature of the light-emitting module 41.

Figure 5:
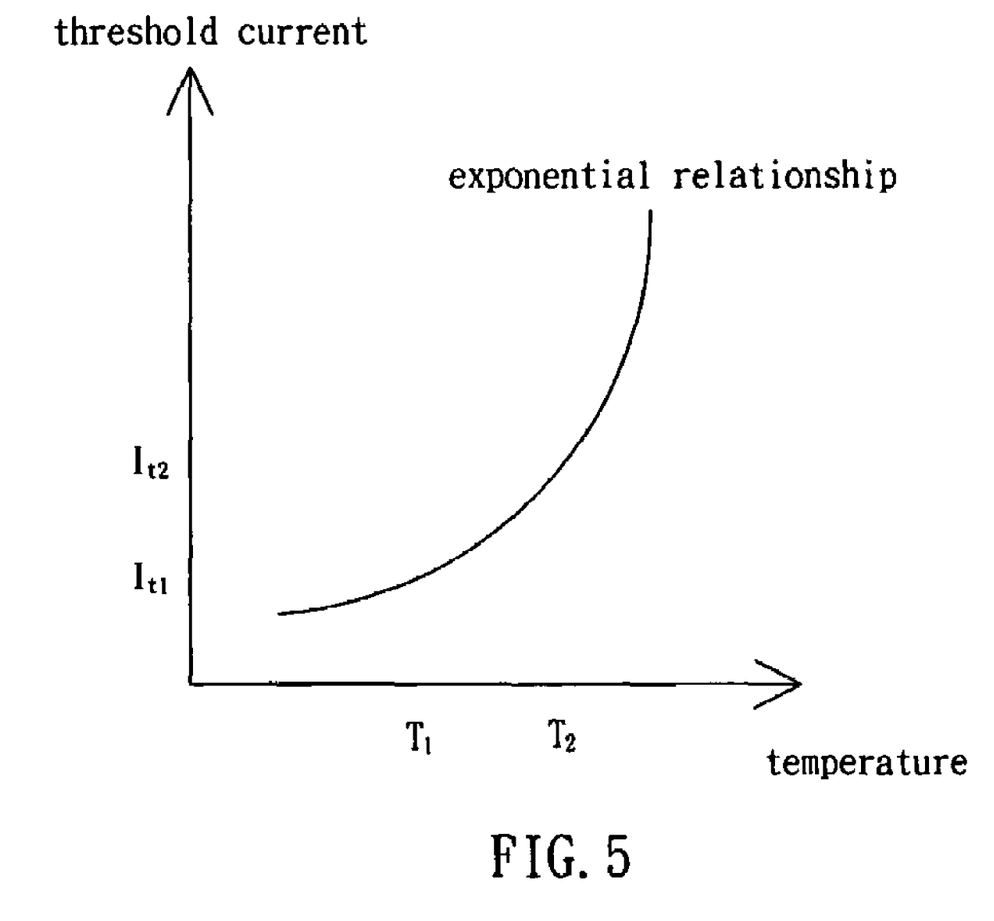
FIG. 5 is a curve relation diagram showing the temperature and the threshold current of the light-emitting module in the operating current modifying device according to the preferred embodiment of the invention.

Generally speaking, the light-emitting module 41 is implemented with a laser diode, so that the temperature and the threshold current of the light-emitting module 41 are related in an exponential relationship (as shown in FIG. 5).

Besides, the light-sensing module 42 measures the output power of the light-emitting module 41 to generate a power feedback signal 39 applied for the operating current modifying device 2 to monitor the output power of the light-emitting module 41.

In addition, the temperature measuring module 43 measures the temperature of the light-emitting module 41 to output a temperature signal 38, and the digital-to-analog converting module 44 receives a current control 35 to generate the operating current 34.

Please refer to FIG. 4 again, the operating current modifying device 2 includes a threshold current modifying module 21, a power modifying module 22, a current compensating module 24, a power control module 23 and a target power control module 25.

The threshold current modifying module 21 receives a temperature signal 38 and outputs a threshold current modifying signal 31 according to the temperature signal 38 and the functional relationship. The target power control module 25 generates a target power signal 36. Besides, the power modifying module 22 receives the power feedback signal 39 and the target power signal 36, and outputs an operating current modifying signal 37 according to a difference between the power feedback signal 39 and the target power signal 36.

In addition, the current compensating module 24 receives the threshold current modifying signal 31 and the operating current modifying signal 37, and based on the operating current modifying signal 37, provides an operating current compensating signal 32 and a threshold current compensating signal 33.

Besides, the power control module 23 receives the operating current compensating signal 32 and the threshold current compensating signal 33 to adjust the operating current 35.

The operating current 35 is provided to control the digital-to-analog converting module 44 to adjust the operating current 34.

In this embodiment, the target power signal 36 represents a target power. The operating current modifying signal 37 represents a required current drive for the light-emitting module 41 to generate the output power up to the target power. The threshold current modifying signal 31 represents the threshold current of the light-emitting module 41 at a given moment.

Besides, in order to determining if the temperature of the light-emitting module 41 changes, the current compensating module 24 determines if the threshold current modifying signal 31 changes. When the modifying signal 31 changes, the threshold current of the light-emitting module 41 also changes as caused by the varying temperature. In order to compensate for the threshold current of the light-emitting module 41 firstly, the current compensating module 24 determines if the operating current modifying signal 37 is smaller than a difference between the threshold current modifying signal 31 and the threshold current compensating signal 33.

If the operating current modifying signal 37 is smaller than the difference, the current compensating module 24 updates the threshold current compensating signal 33 according to the operating current modifying signal 37 and the previous threshold current compensating signal 33. If the operating current modifying signal 37 is not smaller than the difference, the current compensating module 24 updates the threshold current compensating signal 33 according to the threshold current modifying signal 31, and updates the operating current compensating signal 32 according to a difference between the operating current modifying signal 37 and the threshold current modifying signal 31.

In addition, when the threshold current modifying signal 31 does not change, the threshold current of the light-emitting module 41 does not change either. The current compensating module 24 does not need to additionally compensate the threshold current of the light-emitting module 41. Therefore, the current compensating module 24 does not update the threshold current compensating signal 33. In order to compensate the operating current to drive the light-emitting module 41 to generate the output power at a given moment, the current compensating module 24 updates the operating current compensating signal 32 according to the operating current modifying signal 37.

Figure 6:
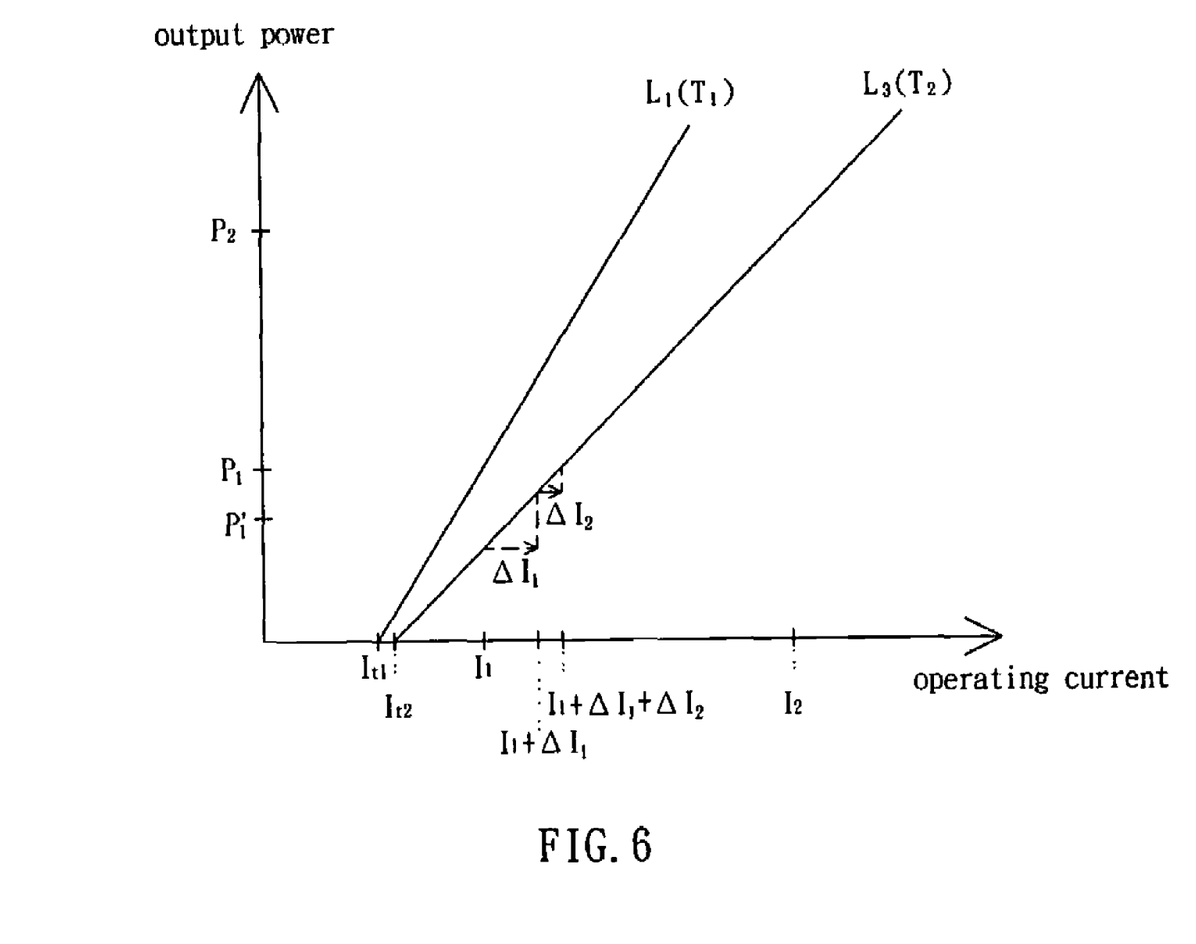
FIG. 6 is a curve relation diagram showing the output power and the operating current of the light-emitting module in the operating current modifying device according to the preferred embodiment of the invention.

Referring to FIG. 4 and FIG. 6, when the temperature of the light-emitting module 41 is at temperatures $T_1$ and $T_2$, the output power of the light-emitting module 41 and the operating current 34 are related by lines $L_1$ and $L_2$.

In this embodiment, the temperature of the light-emitting module 41 is at temperature $T_1$. The target output power of the light-emitting module 41 is set at power $P_1$. The operating current compensating signal 32 is equal to current $I_1 - I_{t1}$. The threshold current compensating signal 33 is equal to current $I_{t1}$. The power control 23 computes the required operating current ($I_1$) to output the current control signal 35. The digital-to-analog converting module 44 adjusts the operating current 34, such that the light-emitting module 41 generates the output power $P_1$.

In addition, the temperature of the light-emitting module 41 rises to the temperature $T_2$ and the target power of the target power signal 41 is still set at power $P_1$. The operating current 34 is still at the current $I_1$, so that the light-emitting module 41 generates an output power $P_1'$.

The temperature measuring module 43 measures the temperature of the light-emitting module 41 as temperature $T_2$ to output the temperature signal 38. The threshold current modifying module 21 receives the temperature signal 38 to output the threshold current modifying signal 31 ($I_{t2}$).

Besides, the power modifying module 22 computes the operating current modifying signal 37 ($\Delta I_1$) according to a difference of the power feedback signal 39 (power $P_1'$) and the target power signal 36 (power $P_1$) based on a gain value in a close loop feedback control. At this moment, the threshold current modifying signal 31 changes to $I_{t2}$. If the operating current modifying signal 37 ($\Delta I_1$) is not smaller than a difference ($I_{t2} - I_{t1}$) of threshold current modifying signal 31 ($I_{t2}$) and the previous threshold current compensating signal 33 ($I_{t1}$), the current compensating module 24 updates the threshold current compensating signal 33 ($I_{t2}$) according to the threshold current modifying signal 31 ($I_{t2}$), and updates the operating current compensating signal 32 ($\Delta I_1 - I_{t2}$) according to a difference ($\Delta I_1 - I_{t2}$) between the operating current modifying signal 37 ($\Delta I_1$) and the threshold current modifying signal 31 ($I_{t2}$). Therefore, the power control module 23 control the digital-to-analog converting module 44 to adjust the operating current 34 as current $I_1 + \Delta I_1 - I_{t2}$. Thus, the operating current 34 drives the light-emitting module 41 to generate an output power $P_1''$. At this moment, in the way of sensing and modifying as described above, the power modifying module 24 modifies the operating current modifying signal 37 ($\Delta I_2$).

In addition, because the light-emitting module 41 is still at the temperature $T_2$, the threshold current modifying signal 31 remains at $I_{t2}$. Thus the current compensating module 24 does not update the threshold current compensating signal 33 ($I_{t2}$) and updates the operating current compensating signal 32 ($\Delta I_2$) according to the operating current modifying signal 37 ($\Delta I_2$). Therefore, the power control module 23 controls the digital-to-analog converting module 44 to adjust the operating current 34 as current $I_1 + \Delta I_1 - I_{t2} + \Delta I_2$.

Otherwise, when the temperature of the light-emitting module 41 rises from temperature $T_1$ to $T_2$ and the operating current modifying signal 37 ($\Delta I_1$) is smaller than the difference ($I_{t2} - I_t$) of the threshold current modifying signal 31 ($I_{t2}$) and the previous threshold current compensating signal 33 ($I_{t1}$), the current compensating module 24 updates the operating current compensating signal 32 as zero and updates the threshold current compensating signal 33 ($I_{t1} + \Delta I_1$) according to the operating current modifying signal 37 ($\Delta I_1$) and the previous threshold current compensating signal 33 ($I_{t1}$). The threshold current of the light-emitting module 41 is firstly compensated and the closed loop feedback control is maintained stable.

In addition, in order to control the light-emitting module 41 to generate the output power $P_2$, the power control module 23 computes the current control signal 35 ($I_2$) according to the threshold current signal 33 ($I_{t2}$), and the proportional relationship between the output power $P_1$ and the output power $P_2$ in the formula (2).

$$I_2 = I_{t2} + \frac{P_2}{P_1}(I_1 + \Delta I_1 - I_{t2} + \Delta I_2) \qquad (2)$$

Figure 7:
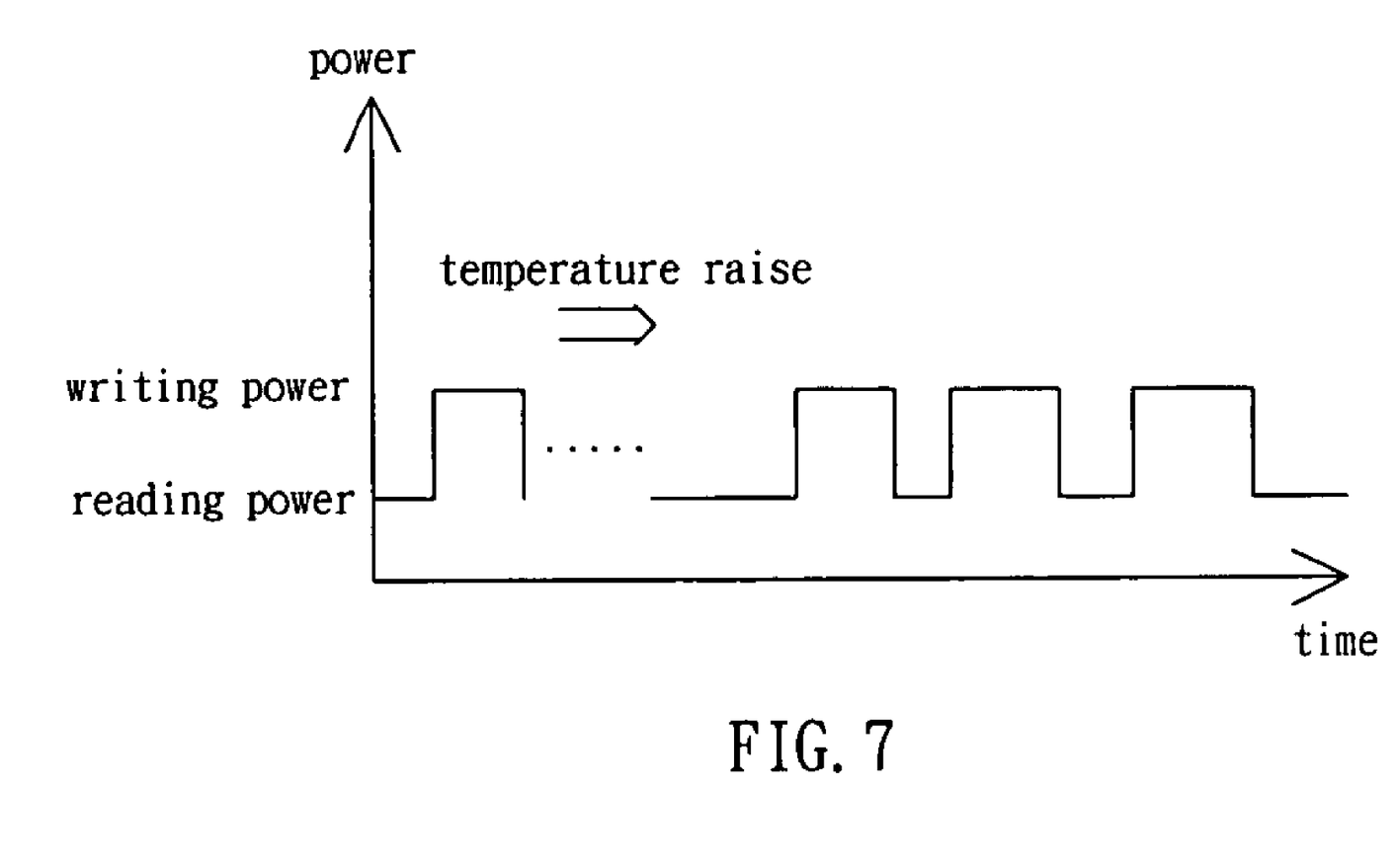
FIG. 7 is a schematic view showing the reading power and the writing power of the optical pickup head in the operating current modifying device according to the preferred embodiment of the invention.

Referring to FIG. 7, therefore, the output power of the light-emitting module 41 is precisely controlled at the powers $P_1$ and $P_2$. The powers $P_1$ and $P_2$ may be a reading power and a writing power of the optical pickup head 4.

Figure 8:
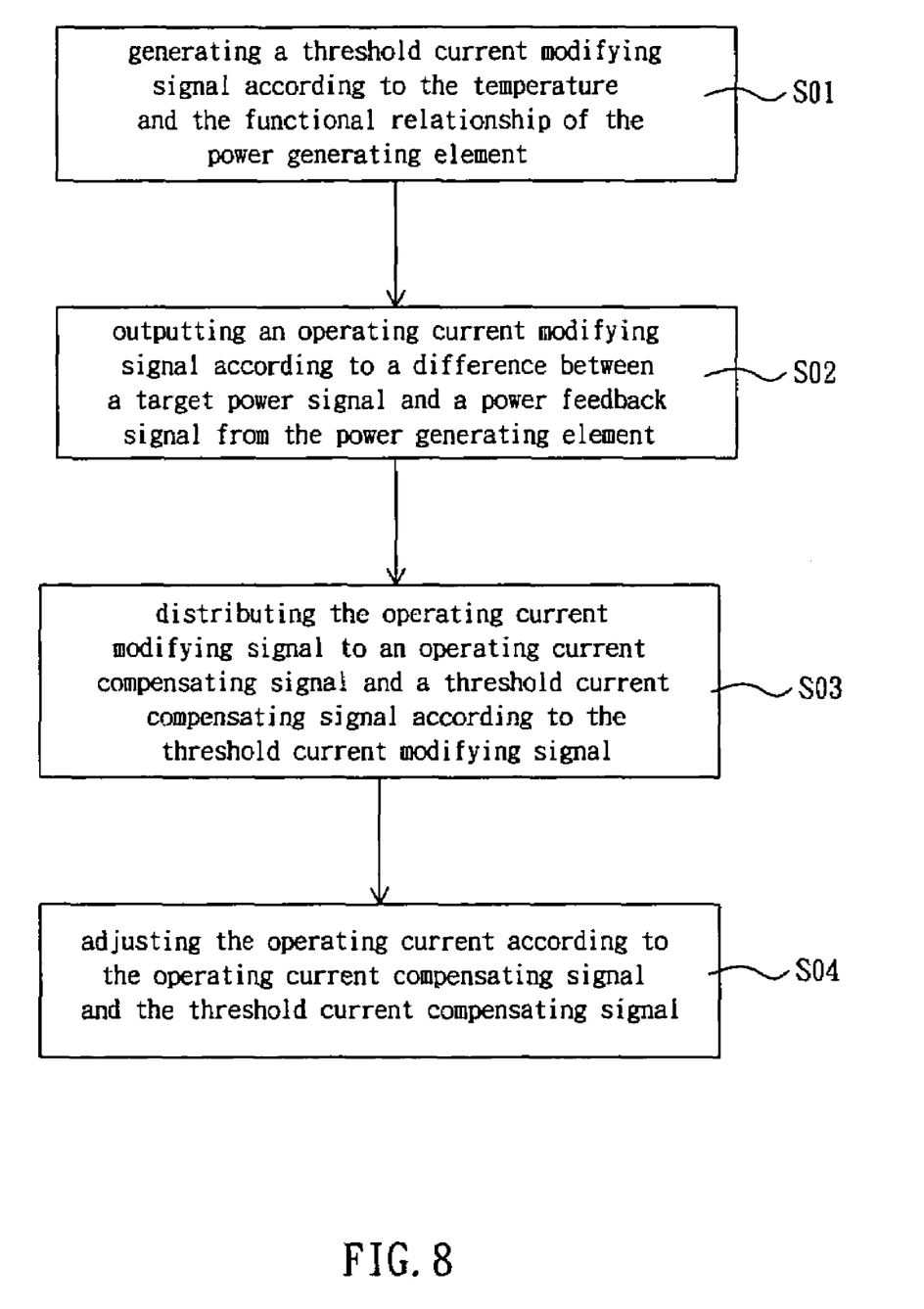
FIG. 8 is a flow chart showing an operating current modifying method according to a preferred embodiment of the invention.

Referring to FIG. 8, an operating current modifying method is provided for a power generating element. The power generating element initially generates an output power when an operating current is larger than a threshold current of the power generating element. The threshold current is related to a temperature of the power generating element in a function relationship. The operating current modifying method includes steps S01-S04.

The step S01 generates a threshold current modifying signal according to the temperature and the functional relationship of the power generating element. The step S02 outputs an operating current modifying signal according to a difference between a target power signal and a power feedback signal from the power generating element. The step S03 distributes the operating current modifying signal into an operating current compensating signal and a threshold current compensating signal according to the threshold current modifying signal. The step S04 adjusts the operating current according to the operating current compensating signal and the threshold current compensating signal.

The operating current modifying method in the embodiment can be applied to the operating current modifying device as mentioned in the above embodiment shown in FIG. 2 to FIG. 7. Thus, the operating current modifying method of this embodiment can be realized with reference to the previous embodiments, and the detailed descriptions of the previous embodiments are omitted here.

In summary, the operating current modifying device and method according to the invention controls the operating current based on the temperature of the power generating element and the functional relationship. Thus, the required current for different output powers and temperature in the power generating element is controlled such that the output power of the power generating element is precisely controlled.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An operating current modifying device for a power generating element, wherein the power generating element initially generates an output power if an operating current is larger than a threshold current of the power generating element, and the threshold current is related to a temperature of the power generating element in a functional relationship, the operating current modifying device comprising:
   a threshold current modifying module configured to receive a temperature signal from the power generating element and to output a threshold current modifying signal according to the temperature signal and the functional relationship;
   a power modifying module configured to receive a power feedback signal from the power generating element and a target power signal and to output an operating current modifying signal;
   a current compensating module configured to receive the threshold current modifying signal and the operating current modifying signal and to distribute the operating current modifying signal to an operating current compensating signal and a threshold current compensating signal; and
   a power control module configured to receive the operating current compensating signal and the threshold current compensating signal and to adjust the operating current.

2. The operating current modifying device as recited in claim 1, wherein the threshold current modifying signal represents the threshold current of the power generating element at the temperature.

3. The operating current modifying device as recited in claim 1, wherein the current compensating module is further configured to undate the operating current compensating signal according to the operating current modifying signal if the threshold current modifying signal does not change.

4. The operating current modifying device as recited in claim 1, wherein the current compensating module is further configured to update the threshold current compensating signal according to the operating current modifying signal if the threshold current modifying signal changes and the operating current modifying signal is smaller than a difference between the threshold current modifying signal and the threshold current compensating signal.

5. The operating current modifying device as recited in claim 1, wherein the current compensating module is further configured to update the threshold current compensating signal according to the threshold current modifying signal and to update the operating current compensating signal according to a difference between the operating current modifying signal and the threshold current modifying signal if the threshold current modifying signal changes and the operating current modifying signal is not smaller than a difference between the threshold current modifying signal and the threshold current compensating signal.

6. The operating current modifying device as recited in claim 1, wherein the functional relationship is an exponential relationship.

7. The operating current modifying device as recited in claim 1, wherein the power generating element is an optical pickup head.

8. The operating current modifying device as recited in claim 7, wherein the optical pickup head comprises:
   a digital-to-analog converting module controlled by the power control module to generate the operating current;
   a light-emitting module driven by the operating current to generate the output power; and
   a temperature measuring module measuring the temperature to generate the temperature signal.

9. The operating current modifying device as recited in claim 7, wherein the operating current modifying device and the optical pickup head are installed in an optical disc drive.

10. The operating current modifying device as recited in claim 1, wherein the threshold current modifying module, the power modifying module, the current compensating module, and the power control module are implemented with an integrated circuit.

11. An operating current modifying method, comprising:
   generating an output power when an operating current is larger than a threshold current, wherein the threshold current is related to a temperature by a functional relationship;
   generating a threshold current modifying signal according to the temperature and the functional relationship;
   outputting an operating current modifying signal according to a difference between a target power signal and a power feedback signal;
   distributing the operating current modifying signal to an operating current compensating signal and a threshold current compensating signal according to the threshold current modifying signal; and
   adjusting the operating current according to the operating current compensating signal and the threshold current compensating signal.

12. The operating current modifying method as recited in claim 11, wherein the threshold current modifying signal represents the threshold current of a power generating element at the temperature.

13. The operating current modifying method as recited in claim 11, wherein the distributing the operating current modifying signal includes:
   updating the operating current compensating signal according to the operating current modifying signal if the threshold current modifying signal does not change.

14. The operating current modifying method as recited in claim 11, wherein the distributing the operating current modifying signal includes:
   updating the threshold current compensating signal according to the operating current modifying signal if the threshold current modifying signal changes and the operating current modifying signal is smaller than a difference between the threshold current modifying signal and the threshold current compensating signal.

15. The operating current modifying method as recited in claim 11, wherein the distributing the operating current modifying signal includes:
   updating the threshold current compensating signal according to the threshold current modifying signal; and
   updating the operating current compensating signal according to a difference between the operating current modifying signal and the threshold current modifying signal if the threshold current modifying signal changes and the operating current modifying signal is not smaller than a difference between the threshold current modifying signal and the threshold current compensating signal.

16. The operating current modifying method as recited in claim 11, wherein the functional relationship is an exponential relationship.

17. The operating current modifying method as recited in claim 12, wherein the power generating element is an optical pickup head.

18. The operating current modifying device as recited in claim 1, wherein the current compensating module is further configured to update the threshold current compensating signal according to (a) the operating current modifying signal and (b) a previous value of the threshold current compensating signal if the threshold current modifying signal changes and the operating current modifying signal is smaller than a difference between the threshold current modifying signal and the threshold current compensating signal.

19. The operating current modifying method as recited in claim 11,
   wherein the distributing the operating current modifying signal includes:
      updating the threshold current compensating signal according to the operating current modifying signal and a previous value of the threshold current compensating signal if the threshold current modifying signal changes and the operating current modifying signal is smaller than a difference between the threshold current modifying signal and the threshold current compensating signal.

20. An operating current modifying apparatus, comprising:
   means for receiving a temperature signal and for providing a threshold current modifying signal according to the temperature signal and a functional relationship;
   means for receiving a power feedback signal and for providing an operating current modifying signal according to a difference between the power feedback signal and a target power level;
   means for providing an operating current compensating signal according to the operating current modifying signal;
   means for providing a threshold current compensating signal according to the operating current modifying signal and a previous value of the threshold current compensating signal; and
   means for providing an operating current according to the operating current compensating signal and the threshold current compensating signal.

* * * * *

UNITED STATES PATENT AND TRADEMARK OFFICE
CERTIFICATE OF CORRECTION

PATENT NO. : 7,518,975 B2 Page 1 of 1
APPLICATION NO. : 11/339749
DATED : April 14, 2009
INVENTOR(S) : Ronnie Lai et al.

It is certified that error appears in the above-identified patent and that said Letters Patent is hereby corrected as shown below:

In column 2, line 5, delete "I.$_2$" and insert -- I$_2$ --, therefor.

In column 6, line 36, delete "T$_{1\ to\ T2}$" and insert -- T$_1$ to T$_2$ --, therefor.

In column 8, line 7, claim 3, delete "undate" and insert -- update --, therefor.

In column 10, claim 19, line 10-11, delete "wherein the distributing the operating current modifying signal includes:" and insert the same after "claim 11," on line 9 as a continuation of the paragraph.

Signed and Sealed this

Sixteenth Day of June, 2009

JOHN DOLL
*Acting Director of the United States Patent and Trademark Office*